C. B. HARRINGTON.
MOTION PICTURE APPARATUS.
APPLICATION FILED APR. 14, 1920.
1,403,549.
Patented Jan. 17, 1922.
5 SHEETS—SHEET 1.
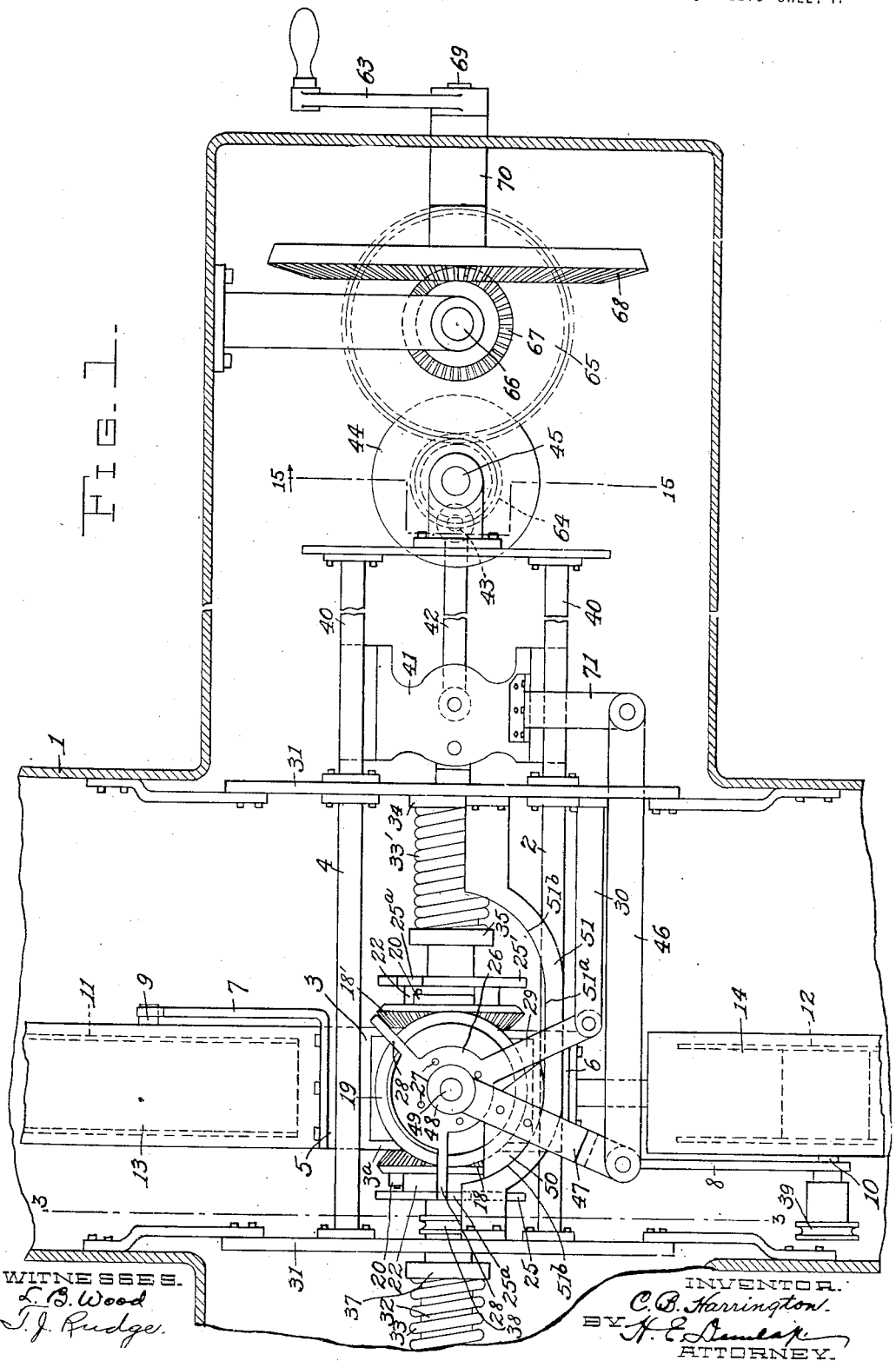

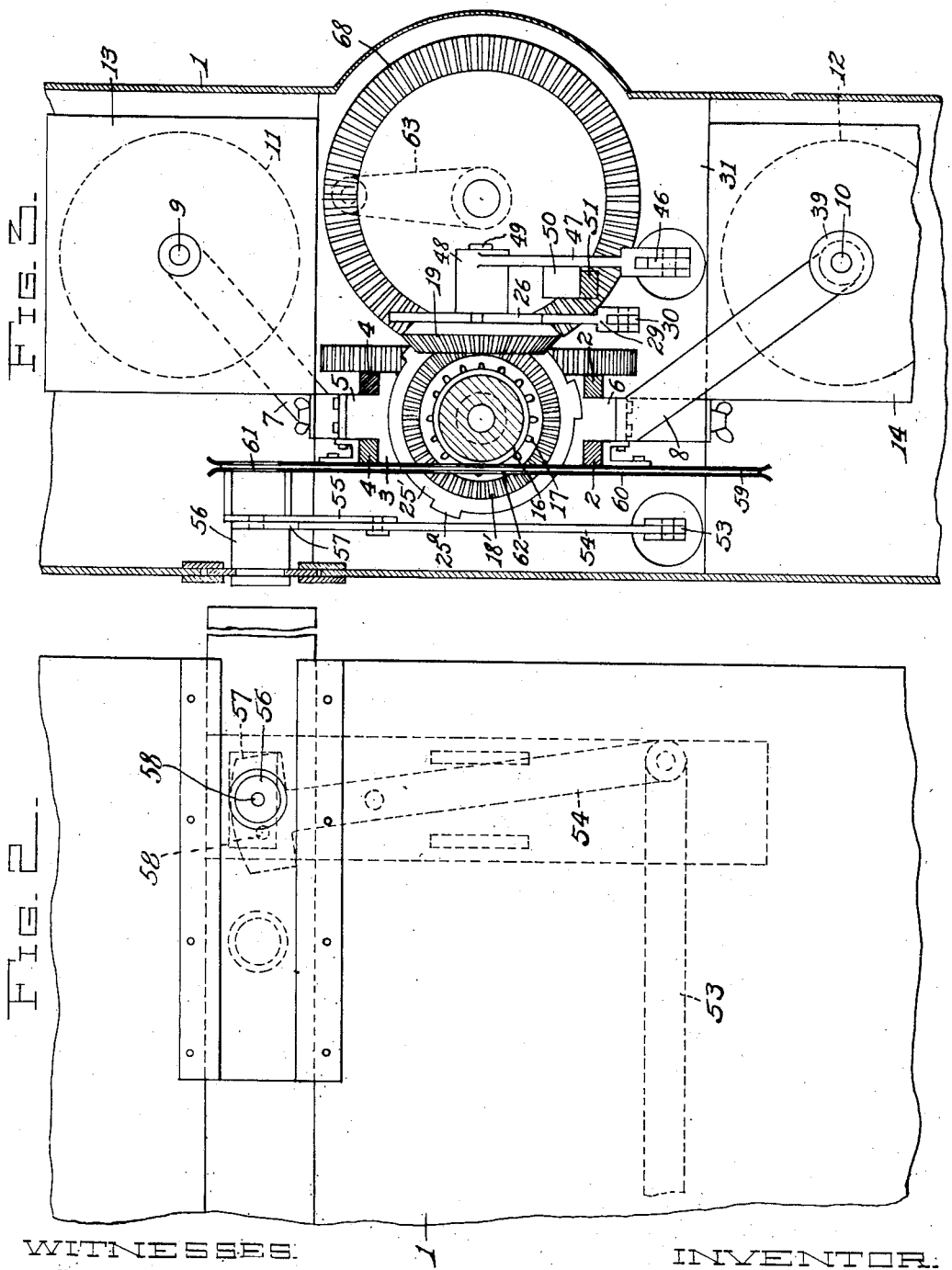

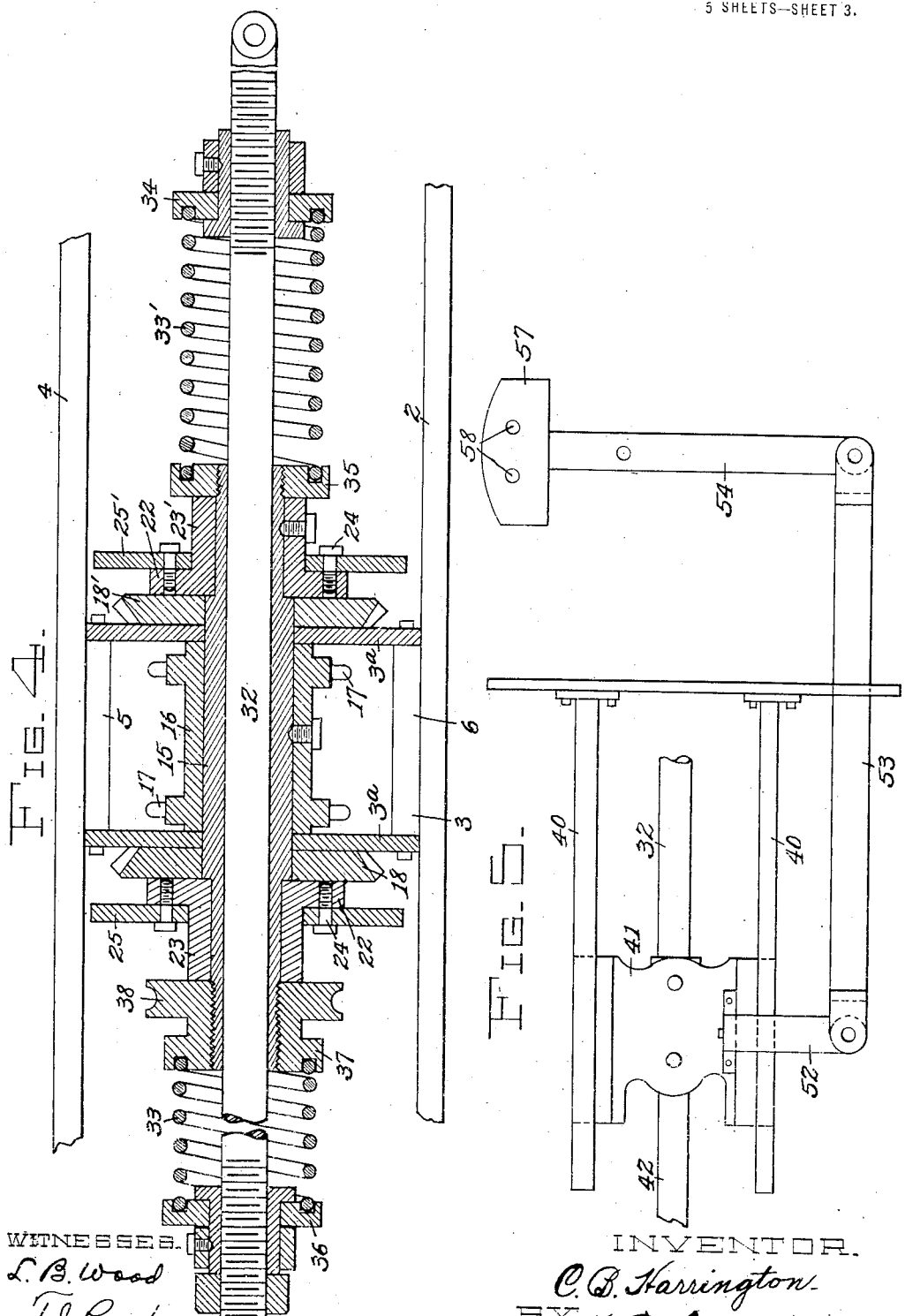

C. B. HARRINGTON.
MOTION PICTURE APPARATUS.
APPLICATION FILED APR. 14, 1920.
1,403,549.
Patented Jan. 17, 1922.
5 SHEETS—SHEET 4.
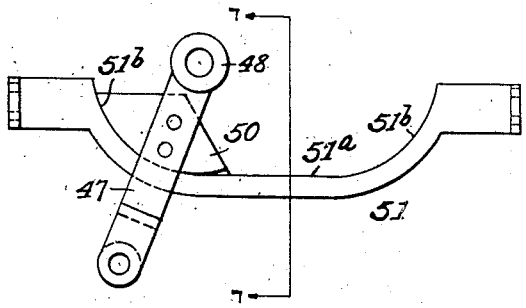
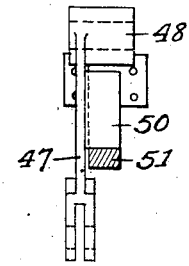
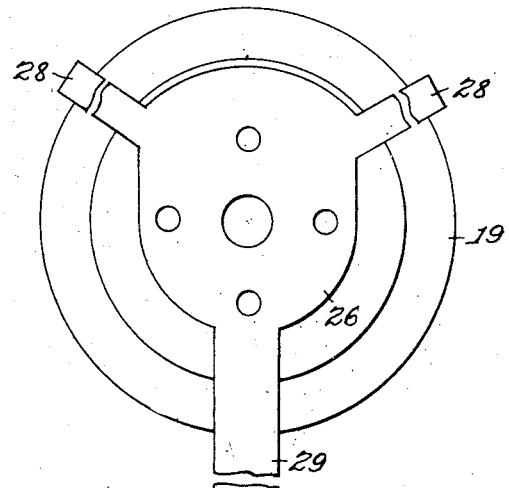
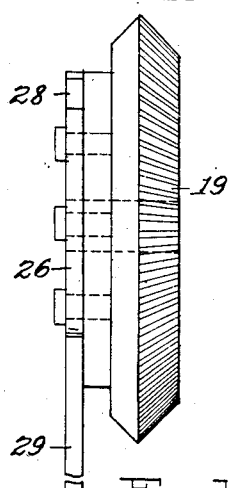
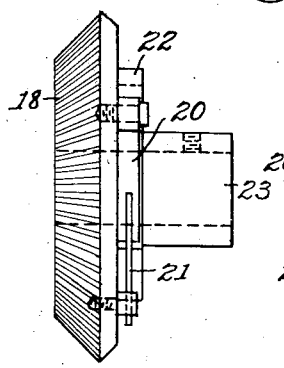
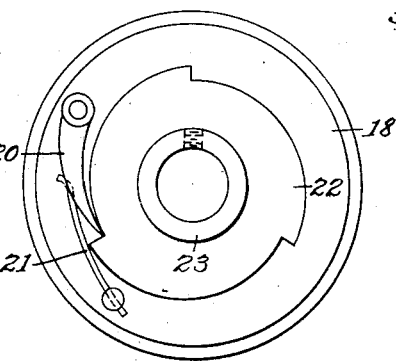
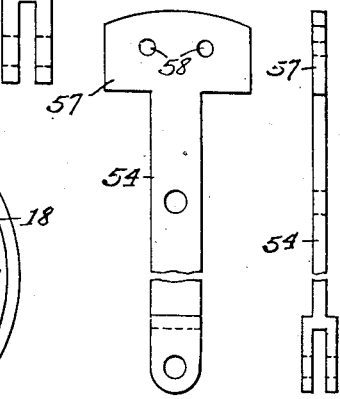
WITNESSES.
L. B. Wood
T. J. Rudge.
INVENTOR.
C. B. Harrington.
BY
H. E. Dunlap
ATTORNEY.

C. B. HARRINGTON.
MOTION PICTURE APPARATUS.
APPLICATION FILED APR. 14, 1920.
1,403,549.
Patented Jan. 17, 1922.
5 SHEETS—SHEET 5.
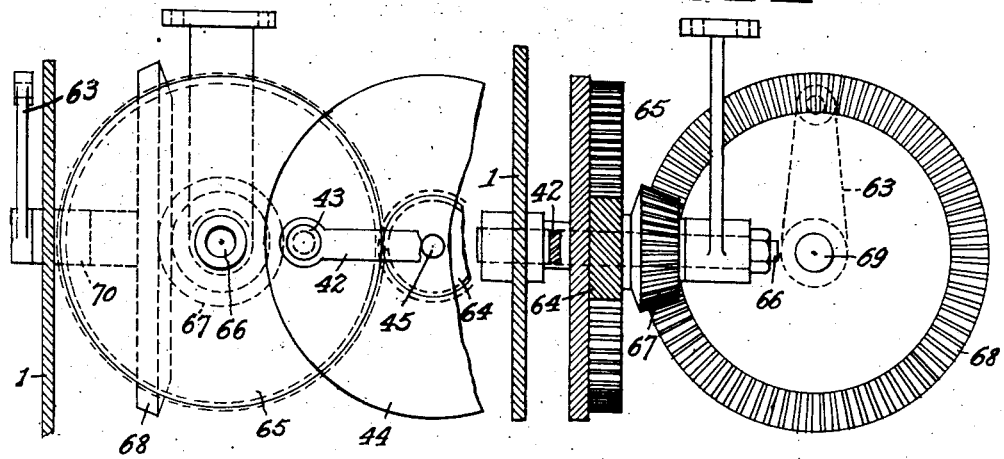
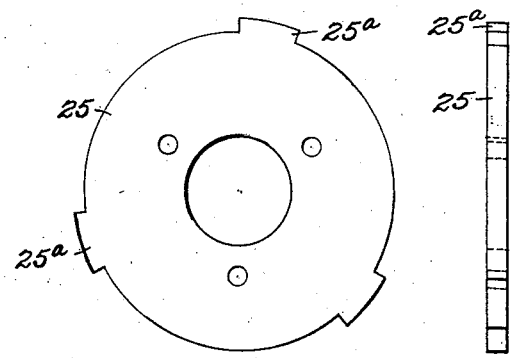
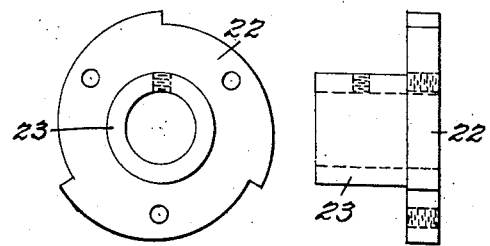
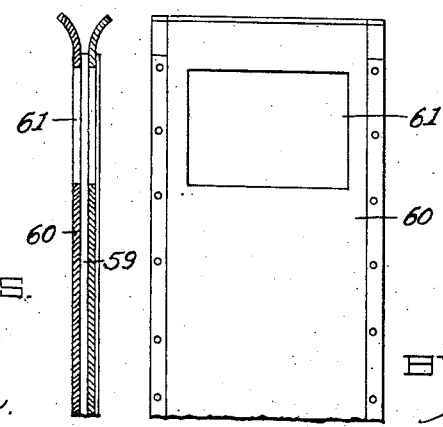
WITNESSES.
L. B. Wood
T. J. Rudge.
INVENTOR.
C. B. Harrington
BY
N. E. Dunlap
ATTORNEY.

UNITED STATES PATENT OFFICE.

CLAUDE B. HARRINGTON, OF McMECHEN, WEST VIRGINIA, ASSIGNOR OF ONE-THIRD TO GLENN HARDMAN, OF McMECHEN, WEST VIRGINIA.

MOTION-PICTURE APPARATUS.

1,403,549.  Specification of Letters Patent.  Patented Jan. 17, 1922.

Application filed April 14, 1920. Serial No. 373,727.

*To all whom it may concern:*

Be it known that I, CLAUDE B. HARRINGTON, a citizen of the United States of America, and resident of McMechen, county of Marshall, and State of West Virginia, have invented certain new and useful Improvements in Motion-Picture Apparatus, of which the following is a specification.

This invention relates broadly to motion picture apparatus, and more particularly to a camera or machine for the taking of motion pictures.

The chief object of the invention is to provide a motion picture camera having associated therewith mechanisms whereby it is reciprocated between two definitely related exposure positions by intermittent movements, and alternate exposures are consequently effected at such separated points or stations, so that successive pictures carried by the film will, when exhibited by projecting them upon a screen in rapid succession, blend or dissolve for producing stereoscopic vision in which the observer receives the impression of a single image viewed in binocular vision.

A further object is to provide a machine of the character mentioned in which the camera is reciprocated or oscillated rhythmically and with a minimum of vibration between the exposure stations and is allowed an interval of rest at each of said stations, during which interval a film exposure of definite duration is effected.

A still further object is to structurally improve, simplify and render more reliable the structure disclosed in my prior Patent No. 1,321,629, dated November 11, 1919.

The invention is illustrated in the accompanying drawings, in which—

Figure 1 is a partial sectional elevation viewed from the rear;

Figure 2 is a partial front elevation;

Figure 3 is a partial sectional elevation taken substantially on the line 3—3, Fig. 1, but showing the carriage and carriage-borne parts in section;

Figure 4 is an enlarged longitudinal section of the carriage and certain of the parts associated therewith;

Figure 5 is a front elevation of the camera shutter and shutter-actuating mechanism;

Figure 6 is a rear elevation of the mechanism which limits the travel of the carriage;

Figure 7 is a section on line 7—7, Fig. 6;

Figure 8 is an enlarged rear elevation of the oscillating bevel gear and attached plate;

Figure 9 is a side elevation of the same;

Figure 10 is a side elevation of one of the pawl and ratchet mechanisms and the bevel gear which carries the pawl;

Figure 11 is a face view of the same;

Figures 12 and 13 are front and side elevations, respectively, of the shutter and the oscillating arm by which it is carried;

Figure 14 is an enlarged front elevation of the driving gears;

Figure 15 is a section taken substantially on line 15—15, Fig. 1;

Figures 16 and 17 are plan and edge views, respectively, of the lug-carrying disks;

Figures 18 and 19 are plan and edge views of one of the ratchet disks;

Figure 20 is a central vertical section of the upper portion of the film-guide; and Figure 21 is a front elevation of the same.

Referring to said drawings, 1 indicates a casing within which is suitably mounted a transversely disposed frame which includes two pairs of horizontally arranged parallel bars, the bars 2 of the lower pair constituting a support for a carriage 3, and the bars 4 of the upper pair being disposed in closely overlying relation to said carriage and being designed to maintain the latter seated upon said bars 2, said two pairs of bars forming a trackway for said carriage. Upper and lower guide-pieces 5 and 6 formed on said carriage are snugly received for sliding movement between the bars 4 and 2, respectively; and suitably mounted upon said guide-pieces 5 and 6 are brackets 7 and 8 which carry spindles 9 and 10 for the reception of film-carrying reels 11 and 12, respectively, said reels being carried, as ordinarily, within casings, as 13 and 14.

The carriage includes opposite end members 3ᵃ in which a hollow sleeve 15 is rotatably mounted with its opposite ends projected outward a substantial distance from said end members. Mounted upon said sleeve 15 between said carriage members 3ᵃ is a cylinder 16 having two circumferentially disposed rows of pins 17 designed to enter the usual rows of perforations provided in the marginal edges of the film, so that said film is positively advanced from the upper reel 11 to the lower reel 12 when said cylinder is rotated.

Loosely mounted to be freely rotatable upon the opposite projecting end portions of the sleeve 15 adjacent to the end members 3ª of the carriage are opposite inwardly facing bevel gears 18 and 18′ which are operatively engaged with diametrically opposite portions of a bevel gear 19 located rearward of the carriage. The bevel gear 18 carries on its outer face a pivoted pawl 20 having associated therewith a spring 21 whereby it is yieldingly held with its point in engagement with the periphery of a ratchet wheel or disk 22 rigidly carried by an adjacent reduced end portion of the sleeve 15 and having an integral outwardly extending boss 23. Said ratchet disk and pawl are so arranged that rotation of the gear 19 in one direction produces forward rotation of the sleeve 15 and of the cylinder 16 for advancing the film.

Fixed, as by means of attaching screws 24, upon said boss 23, and also upon a boss 23′ of a ratchet-wheel or disk 22 fixed upon the opposite end portion of the sleeve 15, is a disk 25 having a plurality of spaced peripheral lugs 25ª, three of such lugs being shown in the drawings, as is most clearly shown in Fig. 16. A plate 26 fixed, as by screws 27, to the outer face of the gear 19 has two laterally extending arms 28 designed to alternately cooperate with the opposite disks 25 and 25′ in a manner and for a purpose which will hereinafter be explained. Said plate also has a depending arm 29 of suitable length which has its lower end pivoted at a fixed point located midway between the opposite limits of travel of the carriage, as upon the end of a fixed bracket or arm 30 carried by one of the trackway supporting members 31 of the frame.

Extending longitudinally through and freely movable with respect to the sleeve 15 is a rod 32 having its opposite ends projecting outward from said sleeve. Spiral compression springs 33 and 33′ are disposed in encircling relation to said projecting ends of said rod, the spring 33′ being interposed between a collar 34 adjustably mounted on an end of said rod and a nut or disk 35 which is threaded or otherwise suitably mounted upon the adjacent end of the sleeve against the end of the adjacent boss 23. The opposite spring 33 is interposed between an adjustable collar 36 carried on the opposite end of said rod and a member 37 which is threaded or otherwise suitably mounted upon the opposite end of said sleeve and which preferably has formed integral therewith a pulley 38 adapted to be connected by means of a belt to a pulley 39 carried by an end of the spindle 10 upon which the lower reel 12 rotates.

Mounted for horizontal reciprocating movement between guides 40 carried by the frame is a crosshead 41 coupled by means of a connecting rod 42 to a crank pin 43 carried eccentrically by a disk 44 which is fixed upon a suitably mounted shaft 45. As is obvious, rotation imparted to said disk 44 produces, through said connecting rod, reciprocation of said crosshead 41 and also of the rod 32 the adjacent end of which extends through the member 31 of the frame and is rigidly attached to said crosshead. Rigidly attached to said crosshead 41 at one side thereof is a depending arm 71 to the lower end of which is pivoted an end of a pitman-like bar 46 which has its opposite end connected in like manner to the lower end of a rocker arm 47. Said arm 47 constitutes a support for the gear 19 and plate 26, the upper end thereof being attached to or formed integral with a bearing 48 in which is journaled a spindle 49 upon which said gear and said plate are rigidly mounted. Fixed upon the front face of said arm 47 intermediate the ends of the latter is a block 50 which has an arcuately curved lower surface arranged for sliding travel upon a trackway 51 located laterally of the path of travel of the carriage 3. Said trackway 51 is suitably mounted, as by attaching its ends to the opposite frame members 31. An intermediate portion 51ª of the upper surface of said trackway is horizontal, while the opposite end portions 51ᵇ thereof are arcuately curved, said portions forming arcs of circles struck from centers in the axial line of the spindle 49 when the latter occupies the opposite limits of movement to which it is carried by reciprocation of the carriage 3. In actual practice, said intermediate portion 51ª approximates one inch in length; hence the distance of travel of the carriage also approximates one inch.

In the reciprocation of the carriage the slide-block 50 the under surface of which has a curvature corresponding to that of the curved surfaces 51ᵇ, is actuated to slide freely along the horizontal portion 51ª of the trackway 51. Prior to the completion of the reciprocating movement, however, said block engages and travels up the adjacent curved surface 51ᵇ, said slide-block and said curved surface thus cooperating to gradually retard, or slow up, the movement adjacent to each end of the stroke for relieving the jars or shocks to which the mechanism would otherwise be subjected at the opposite limits of the reciprocating movement.

Referring specifically to Fig. 1 of the drawings, when the parts of the mechanism travel toward the positions shown in said figure, the gear 19 is actuated to rotate in a counter-clockwise direction, due to the fact that it is disposed in fixed relation to the plate 26 the arm 29 of which is pivoted upon the stationary bracket arm 30. This rotating movement of said gear, which occurs during the travel of the carriage, produces forward rotary movement of the gear 18' for actuating the sleeve 15 and cylinder 16 to rotate therewith for advancing the film; and also produces rearward rotation of gear 18 whereby the pawl 20 of the latter is retracted to a point where it engages the next succeeding tooth of the ratchet 22, said ratchet being herein shown as having three teeth located at regularly spaced intervals. Upon the return stroke of the carriage—that is, when the carriage travels from left to right—the gear 19 is rotated clockwise, producing forward rotation of gear 18 and rearward rotation of gear 18'. This forward rotation of gear 18 produces, through the pawl and ratchet mechanism associated therewith, forward rotation of the sleeve and cylinder for advancing the film; and the rearward rotation of gear 18' withdraws its pawl to a point where it operatively engages the next succeeding tooth of the adjacent ratchet.

To insure that the film shall travel a definite predetermined distance at each advance movement thereof, it is necessary to provide means for positively stopping the forward rotation of the sleeve and cylinder when they have advanced throughout a definite part of a revolution, or at the end of each one-third revolution when three teeth are provided on the ratchet 22, as herein shown; otherwise, due to the rapidity of the movements of the parts, the momentum of the ratchets, sleeve and cylinder would act to carry said parts beyond the point to which they are positively moved by their actuating gears. Such movement limiting means is afforded by the arms 28 of plate 26 and the lugs 25ª of the disks 25 which are arranged to cooperate at the proper instant. More specifically stated, the left hand arm 28 in Fig. 1 positively engages the forward edge of a lug 25ª of the adjacent disk 25 at the instant that the travel of the carriage in right to left direction ceases, said disk being rotated forward with the sleeve 15 and said lug 25ª meeting the descending arm 28 at the instant stated. As the carriage starts on its left to right stroke, starting forward rotation of the sleeve 15 and cylinder 16 whereby the next advance movement of the film is produced, the said left hand arm 28 moves upward ahead of the advancing lug 25ª with which it is engaged, as aforesaid, and at an intermediate point in the stroke becomes withdrawn from the path of travel of said lug 25ª. At the extreme end of the left to right stroke the right hand arm 28 of plate 26 meets a lug 25ª of the forwardly rotating right hand disk 25', positively stopping rotation of the latter and, consequently, stopping advance movement of the film.

Depending from the crosshead 41 at the side thereof opposite that to which the arm 41 is attached is an arm 52 to the lower end of which is pivotally connected one end of a pitman-like bar 53 which extends laterally and has its opposite end pivotally connected to the lower end of a rocker-arm 54 which is pivoted intermediate its ends upon a suitable support 55 located below the path of horizontal movement of a camera lens 56 which is mounted to travel with the carriage 3. The upper end of said rocker-arm 54 carries a head-piece 57 which constitutes a shutter for said camera lens. Said shutter is provided with two relatively spaced apertures or eyes 58 designed to be alternately presented behind and in alinement with the lens camera for exposing a short length of the film which travels behind and at an appropriate distance from said shutter.

The film travels through a vertical passage 59 provided therefor in a suitable filmguide 60 which is rigidly mounted upon the front part of the carriage. Said film-guide has a rectangular opening or gate 61 therein through which the requisite area of the film is exposed when an eye of the shutter is presented in alinement with the lens of the camera. Additional openings 62 are provided at suitable points in said film-guide for permitting the pins 17 carried by the cylinder 16 to unobstructedly engage the film for advancing the latter.

The spiral springs 33 and 33' are designed to yieldingly hold the rod 32 against longitudinal movement with respect to the sleeve 15 and the other parts of the carriage-borne mechanism.

Assuming that the parts of the mechanism occupy the positions shown in Fig. 1, forward rotation of the disk 44, effected by any suitable means, as through a suitable train of gears interposed between said disk and a hand crank 63, will, through the connecting rod 42 and crosshead 41, draw the rod 32 longitudinally toward the right, carrying therewith the carriage 3 and the parts of the mechanism which are directly associated with said rod and said carriage. However, due to the fact that the distance of travel of the crosshead 41 and, consequently, the length of the stroke of the rod 32 in moving to the left-hand position depicted in Fig. 1 was approximately twice the distance through which the carriage, camera and other parts borne by the carriage traveled, resulting in the spring 33' being compressed during the final part of the stroke, or during that portion of the stroke following the instant at which said carriage and the carriage-borne parts reached the limit of their right to left movement, said spring partially reexpands before movement of the carriage in a right hand direction starts. In other words, the rod 32 is drawn longitudinally through the sleeve 15 until the pressure exerted by the springs 33 and 33' against the opposite ends of the carriage-borne mechanism is substantially equalized, whereupon the carriage and associated mechanism is actuated to leave its seat and travel with said rod until it seats at the right hand limit of its movement. At this point, due to the fact that the distance of travel of the crosshead 41 is approximately twice that of the carriage, the said crosshead and, consequently, the rod 32 will have completed but about three-fourths of its stroke; hence, the remaining one fourth of the travel of said rod necessary to permit the connecting rod 42 to pass over center, or over the point at which said connecting rod and said rod are in alined relation, must result in longitudinal sliding movement of said rod against the tension of the spring 33.

From the foregoing it will be apparent that the camera borne by the carriage remains at rest, or stationary, at the end of each reciprocating movement thereof throughout the interval required in the travel of the rod throughout the final one-fourth part of its stroke and the initial one-fourth part of the next succeeding stroke. In other words, the camera remains at rest at each of its opposite positions, in which positions exposure of the film is effected, during an interval equal to that required in its travel between said positions. Otherwise expressed, the camera occupies an exposure position during one-half the time when the machine is in operation. And during a definite part of the time said exposure position is occupied, the lens is focused upon the film, the shutter 57 during a part of said period of rest being in a position wherein one of its eyes 58 is disposed in alinement with the lens permitting exposure of the length of film located directly behind the opening 61 of the film-guide 60.

The rocker arm 54 carrying the shutter 57, being mounted upon the carriage, remains in vertical position during travel of the latter, and, consequently, the shutter remains in closing relation to the lens of the camera. When, however, the carriage reaches the end of its travel in either direction, disposing the camera in exposure position, the continued movement of the crosshead 41 actuates said rocker-arm 54, through the bar 53, to swing on its pivot for carrying the shutter 57 to a position presenting one of its eyes in line with the camera lens, as shown in Fig. 2, this exposure occurring at each of the extreme limits of the stroke of the crosshead and, consequently, being of extremely short duration. Obviously, the oscillations of the shutter produced at opposite ends of the stroke occur in opposite directions, one of the eyes 58 being presented in exposure- permitting position at one end of the stroke and the other eye at the opposite end.

While any suitable train of gearing may be employed for effecting rotation of the disk 44 whereby reciprocation is imparted to the carriage and other parts of the mechanism, for illustrative purposes I have herein shown a pinion 64 mounted on the shaft 45 which carries said disk, and disposed in mesh with said pinion is a large spur gear 65 mounted upon a suitably journaled shaft 66. Said shaft 66 also carries a bevel gear 67 which meshes with the bevel gear 68 mounted upon a shaft 69 journaled in a bearing 70 and which projects outward through the side of the casing, carrying a hand crank 63.

From the foregoing description it will be understood that continuous operation of the operating crank produces reciprocation of the carriage 3 and the photographic apparatus carried thereby between two definitely related exposure positions; that said carriage and apparatus remain at rest in each of said positions throughout an interval of time approximately equal to that required to effect its reciprocation from one of said positions to the other, and that the light-excluding shutter of said apparatus occupies a position permitting exposure of a suitable length of film throughout a definite part of the said rest interval. Further, the film is advanced a definite distance during each reciprocation of the carriage so that a new area thereof is presented at each exposure position.

Successive pictures carried by the film are the results of exposures taken at points located a definite distance apart. Therefore, as is apparent, when such pictures are projected upon a screen in rapid succession, a stereoscopic effect is created, the successive pictures taken alternately from the two separated points of view being caused to blend or dissolve to produce stereoscopic vision in which the observer receives the impression of a single image viewed with both eyes.

What is claimed is—

1. A motion picture machine embodying a film camera, means in yieldable relation to said camera for imparting intermittent reciprocatory movement whereby said camera is alternately positioned in two definitely related exposure positions, means for effecting film exposure at each of said positions, means for advancing the film during reciprocating movement of the camera, said advancing means including a rocker member having arms, and means engageable with said arms for positively arresting each rocking movement of said member at a definite point whereby a definite predetermined travel of said film is produced.

2. A motion picture machine embodying a carriage, a film camera mounted on said carriage, means in yieldable relation to said carriage for imparting to the latter intermittent reciprocatory movement whereby said camera is alternately positioned in two definitely related exposure positions, said means permitting an interval of rest at each of said positions, film advancing means actuated by the carriage at each reciprocation, and means definitely limiting the extent of movement of said advancing means.

3. A motion picture machine embodying a carriage, a film camera mounted on said carriage, means for intermittently reciprocating said carriage between two separated definitely related exposure positions, film advancing means, means actuated by carriage reciprocation for actuating said advancing means at each reciprocation, and means associated with the carriage for arresting the speed of the latter adjacent to each end of the path of its reciprocating movement.

4. A motion picture machine embodying a carriage, a film camera mounted on said carriage, means for intermittently reciprocating said carriage between two separated definitely related exposure positions, film advancing means, means actuated by carriage reciprocation for actuating said advancing means at each reciprocation, and means definitely limiting the extent of movement of said advancing means.

5. In a motion picture machine, a carriage, a film camera mounted on said carriage, means for reciprocating said carriage, advancing means carried by said carriage, and means for actuating said advancing means during reciprocation of said carriage, said actuating means including a pair of oppositely disposed bevel gears, a bevel gear operatively engaged at diametrically opposite points with the first mentioned bevel gears, a rocker-like support for the last mentioned gear, said support being mounted for sliding movement during carriage travel, means for imparting rocking movement to said support, and means for imparting rotary movement to said last mentioned gear.

6. In a motion picture machine, a carriage, a film camera mounted on said carriage, means for reciprocating said carriage, film advancing means carried by said carriage, and means for actuating said advancing means during reciprocation of said carriage, said actuating means including a pair of oppositely disposed bevel gears, a bevel gear operatively engaged at diametrically opposite points with the first mentioned bevel gears, a bearing for the last mentioned gear, a rocker-like support for said bearing disposed for sliding movement during carriage travel, means for imparting rotary movement to said last mentioned gear during carriage travel, and means for rocking said support during its sliding movement.

7. In a motion picture machine, a carriage, a film camera mounted on said carriage, means for reciprocating said carriage, film advancing means carried by said carriage, and means for actuating said advancing means during reciprocation of said carriage, said actuating means including a pair of oppositely disposed bevel gears, a bevel gear operatively engaged at diametrically opposite points with the first mentioned bevel gears, a bearing for the last mentioned gear, a trackway having opposite arcuately curved ends, a rocker-like support for said bearing mounted for sliding movement on said trackway during carriage travel, said support having its bearing surface curved to substantially correspond with the curvature of said ends of the trackway, means for rocking said support during its travel, and means for imparting rotary movement to the last mentioned gear during carriage travel.

8. In a motion picture machine, a carriage, a trackway therefor, a film camera mounted on said carriage, a film-feeding cylinder journaled on said carriage, a rod extending through said cylinder and longitudinally movable with respect to the latter, springs carried by the opposite ends of said rod yieldingly maintaining said rod against movement with respect to said carriage, means for longitudinally reciprocating said rod whereby said carriage is reciprocated on said trackway, a second trackway located laterally of the first mentioned trackway, said second trackway having upwardly inclined ends, and means mounted for travel on the second trackway and engageable with the inclined ends of the latter whereby the carriage is arrested before the limits of the reciprocating movement of said rod are reached, and means for imparting film advancing rotary movement to said cylinder during reciprocating movement of the carriage.

In testimony whereof I affix my signature in presence of two subscribing witnesses.

CLAUDE B. HARRINGTON.

Witnesses:
H. E. DUNLAP,
THOS. J. RUDGE.